United States Patent
Mackenzie et al.

(10) Patent No.: US 11,964,576 B2
(45) Date of Patent: Apr. 23, 2024

(54) ELECTRIFIED VEHICLE WIRELESS CHARGING SYSTEM

(71) Applicant: Ford Global Technologies, LLC, Dearborn, MI (US)

(72) Inventors: Kevin Mackenzie, Canton, MI (US); Jonathan Barker, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 118 days.

(21) Appl. No.: 17/538,020

(22) Filed: Nov. 30, 2021

(65) Prior Publication Data

US 2023/0166608 A1 Jun. 1, 2023

(51) Int. Cl.
*B60L 53/124* (2019.01)
*B60L 53/122* (2019.01)
*H02J 7/00* (2006.01)
*H02J 50/90* (2016.01)
*H02J 50/60* (2016.01)

(52) U.S. Cl.
CPC ........... *B60L 53/124* (2019.02); *B60L 53/122* (2019.02); *H02J 7/0047* (2013.01); *H02J 50/90* (2016.02); *B60Y 2200/91* (2013.01); *H02J 50/60* (2016.02)

(58) Field of Classification Search
CPC ........ B60L 53/12–126; B60L 53/38–39; H02J 50/60
See application file for complete search history.

(56) References Cited

U.S. PATENT DOCUMENTS

| 9,145,110 | B2 | 9/2015 | Van Wiemeersch et al. |
| 9,735,605 | B2 | 8/2017 | Britz et al. |
| 2011/0074346 | A1 | 3/2011 | Hall et al. |

(Continued)

FOREIGN PATENT DOCUMENTS

| CN | 108923552 A | * 11/2018 | |
| GB | 2510124 A | * 7/2014 | ............... B60L 1/003 |

(Continued)

OTHER PUBLICATIONS

"2014 Cadillac ELR Owner Manual", Jan. 2014, Cadillac. (Year: 2014).*

(Continued)

*Primary Examiner* — Rexford N Barnie
*Assistant Examiner* — David A Shiao
(74) *Attorney, Agent, or Firm* — Brooks Kushman PC; David B. Kelly (57) ABSTRACT

An electrified vehicle includes a wireless charger that wirelessly receives power from an external source, cameras, LEDs, a speaker, and at least one controller programmed individually or in combination to, when the wireless charger is receiving power from the external source, process images from at least one of the cameras and operate the LEDs and the speaker based on detection of an object within the images. The controller may change the color of the LEDs and/or sound emitted by the speaker in response to whether the object is detected within a first zone farther from the vehicle or a second zone nearer the vehicle. The LEDs and cameras may be positioned on external side mirrors, front, rear, and/or underbody portions of the vehicle. The speaker may be external to the vehicle cabin and provide an audible signal when operating the vehicle in electric mode at low speeds.

17 Claims, 3 Drawing Sheets

(56) References Cited

U.S. PATENT DOCUMENTS

| | | | | |
|---|---|---|---|---|
| 2014/0021912 A1* | 1/2014 | Martin | ............... | B60L 53/124 |
| | | | | 320/109 |
| 2014/0097671 A1* | 4/2014 | Nakamura | ............ | H02J 50/12 |
| | | | | 307/9.1 |
| 2014/0339905 A1* | 11/2014 | Moritsuka | ............ | B60L 53/124 |
| | | | | 307/104 |
| 2015/0028875 A1* | 1/2015 | Irie | ............... | H01F 38/14 |
| | | | | 324/345 |
| 2015/0145529 A1* | 5/2015 | Urano | ............... | G01N 27/025 |
| | | | | 324/655 |
| 2018/0290551 A1* | 10/2018 | Jones | ............... | B60L 53/126 |
| 2018/0316229 A1* | 11/2018 | Anwer | ............... | H02J 50/60 |
| 2019/0248245 A1* | 8/2019 | Golgiri | ............... | H02J 50/10 |
| 2021/0203191 A1* | 7/2021 | Kim | ............... | H02J 50/40 |
| 2021/0237594 A1* | 8/2021 | Prasad | ............... | H04N 23/635 |
| 2022/0073057 A1* | 3/2022 | Sakai | ............... | B60W 30/06 |

FOREIGN PATENT DOCUMENTS

| | | | | | |
|---|---|---|---|---|---|
| JP | 2012165497 A | * | 8/2012 | ............ | B60L 1/003 |
| KR | 2017134015 A | * | 12/2017 | ............ | B60L 11/182 |

OTHER PUBLICATIONS

English machine translation of JP2012165497A published Aug. 30, 2012 (Year: 2012).*
English machine translation of KR20170134015A published Dec. 6, 2017 (Year: 2017).*
English machine translation of CN108923552A published Nov. 30, 2018 (Year: 2018).*

\* cited by examiner

ELECTRIFIED VEHICLE WIRELESS CHARGING SYSTEM

TECHNICAL FIELD

This disclosure generally relates to an electrified vehicle having a wireless charging system that charges a vehicle traction battery.

BACKGROUND

Electrified vehicles may include a high-voltage (HV) battery or other electrical energy store that is used either exclusively or in combination with another power plant, such as an internal combustion engine, to provide propulsive power to the vehicle. The HV battery may be configured for charging by an external source, such as the electric power grid. Wireless vehicle charging has been developed as a convenient "hands-free" method of charging an electrified vehicle that does not require the user to connect a cord/plug to charge the on-board energy store. Because wireless charging systems transfer power using electromagnetic fields (EMF), they may affect operation of various types of devices sensitive to EMF and/or be affected by objects (particularly those containing metal) in close proximity. As such, the systems may include sensors to detect objects within a designated range of the charging components. Sensors may include thermal/infrared or visible light detectors or cameras, radar, capacitance sensors, etc.

SUMMARY

In some configurations, an electrified vehicle includes an electric machine configured to provide torque to vehicle wheels, a traction battery coupled to the electric machine, a wireless charger coupled to the traction battery and configured to wirelessly receive power from an external power source and charge the traction battery, at least one camera positioned to capture an image of an area outside of the electrified vehicle, at least one light, and a controller in communication with the electric machine, the traction battery, the wireless charger, the at least one camera, and the at least one light, the controller programmed to, while the wireless charger is receiving power from the external power source, operate the at least one light in a first mode, and in response to detecting an object based on an image from the at least one camera, operate the at least one light in a second mode. The lights may comprise LEDs, wherein the first mode corresponds to a first color and the second mode corresponds to a second color. The controller may be programmed to operate the light in the second mode while the object is within a first zone of the electrified vehicle and to operate the light in a third mode in response to the object being within a second zone of the electrified vehicle, the second zone being closer to the electrified vehicle than the first zone. The controller may be programmed to stop the wireless charger in response to the object being within the second zone. The vehicle may include an external speaker, wherein the controller is further programmed to operate the external speaker when the electrified vehicle is operating in an electric mode at a vehicle speed below a corresponding threshold, and to operate the external speaker in response to an object being detected based on the image from the at least one camera while the wireless charger is receiving power from the external power source.

In various embodiments, the at least one camera includes a front camera positioned to capture an image including an area forward of the electrified vehicle, a right-side camera positioned to capture an image including an area on a right side of the electrified vehicle, a left-side camera positioned to capture an image including an area on a left side of the electrified vehicle, and a rear camera positioned to capture an image including an area reward of the electrified vehicle. The right-side camera and the left-side camera may be mounted or otherwise connected to a respective side mirror of the electrified vehicle. Similarly, the LEDs may be disposed on the left-side and right-side external mirrors of the vehicle. Alternatively or in combination, the LEDs may be within a passenger cabin of the vehicle.

Embodiments also include a method for controlling a vehicle having a traction battery coupled to an electric machine configured to provide torque to vehicle wheels, a wireless charger configured to wirelessly receive power from an external power source during charging of the traction battery, at least one light, at least one camera, and at least one speaker. The method may include, by a vehicle controller, detecting an object within one of a first zone and a second zone of the vehicle based on an image from the at least one camera while the wireless charger is receiving power from an external power source, operating the at least one light or the at least one speaker based on whether the object is detected within the first zone or the second zone, and controlling the wireless charger in response to whether the object is detected within the first zone or within the second zone. The method may also include operating the at least one light to generate a first color in response to the object being detected within the first zone and to generate a second color in response to the object being detected in the second zone. The method may also include operating the at least one speaker to generate a first sound in response to the object being detected within the first zone and to generate a second sound different from the first sound in response to the object being detected within the second zone.

In one or more embodiments, a vehicle system includes a wireless charger configured to wirelessly receive power from an external power source, a plurality of cameras including at least a front facing camera, a rear facing camera, a left-side camera, and a right-side camera, a plurality of LEDs, and at least one controller programmed individually or in combination to, when the wireless charger is receiving power from the external power source, process images from at least one of the plurality of cameras and operate the plurality of LEDs based on detection of an object within the images. The vehicle system may include at least one speaker, wherein the at least one controller is programmed individually or in combination to operate the at least one speaker based on the detection of the object within the images. The vehicle system may include an external left-side mirror and an external right-side mirror each having at least one of the plurality of LEDs. The at least one controller may be programmed individually or in combination to operate the plurality of LEDs and the at least one speaker in a first mode in response to detection of the object within a first vehicle zone, and to operate the plurality of LEDs and the at least one speaker in a second mode in response to detection of the object within a second vehicle zone. Operation of the plurality of LEDs in the first mode may generate a first color and operation of the plurality of LEDs in the second mode may generate a second color.

One or more embodiments according to the disclosure may provide associated advantages. For example, multi-purpose use of existing vehicle-mounted sensors to detect living or other types of objects during wireless charging reduces or eliminates the need for adding single-purpose or dedicated sensors to the vehicle. Similarly, control of existing electrified vehicle lighting, audio, or other devices to provide signals or alerts related to wireless charging system operation and/or detection of objects may reduce or eliminate inadvertent triggering of an associated reduced power mode or shutdown of the charging system based on unintended intrusions into monitoring zones around the vehicle while charging.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
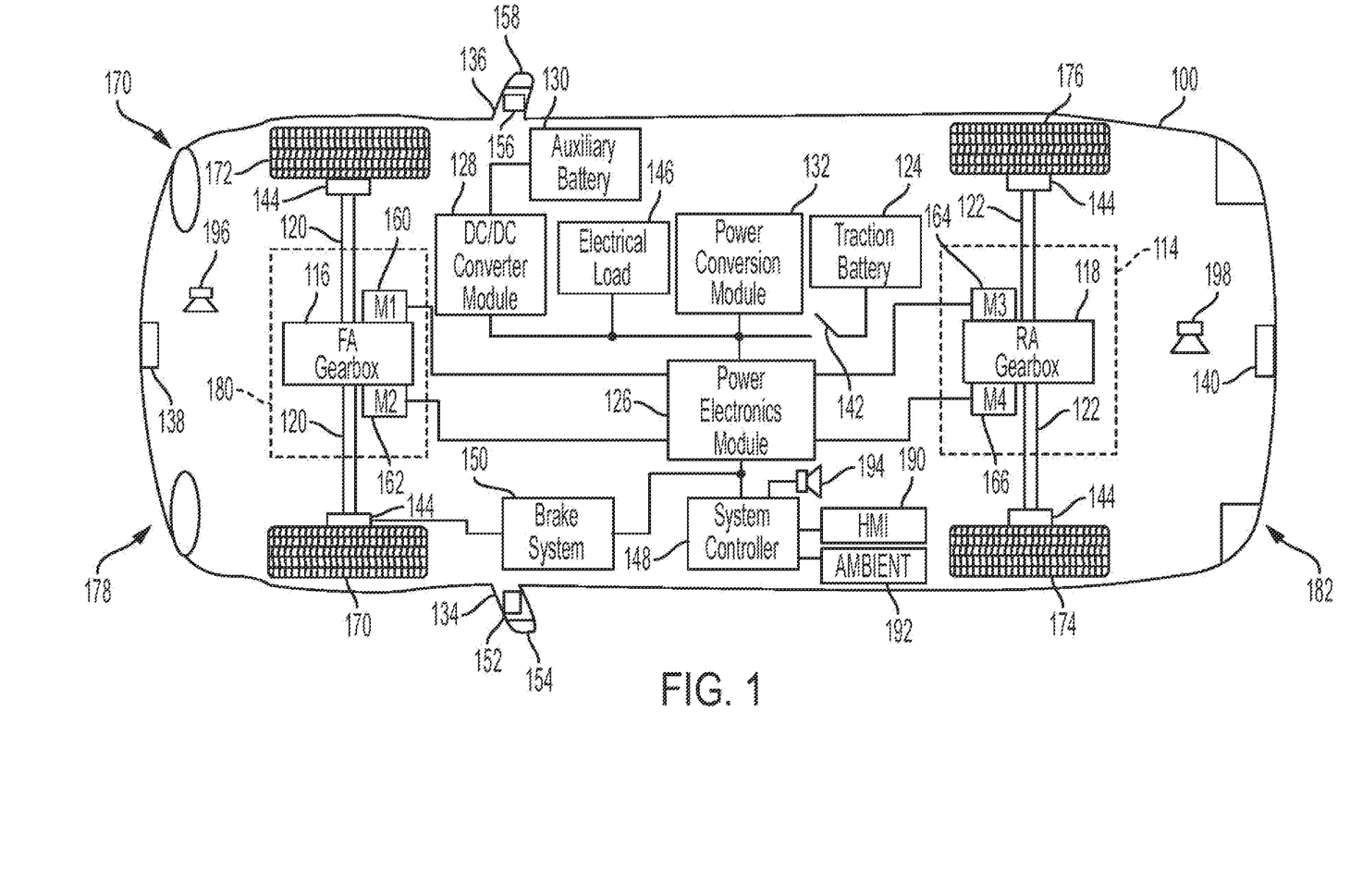
FIG. 1 is block diagram illustrating operation of a representative electrified vehicle having a wireless charging system with vehicle-based object awareness sensors and alerts according to one or more embodiments.

FIG. 1 depicts a representative configuration for an electrified vehicle having a wireless charging system with vehicle-based object awareness according to embodiments of the disclosure. Vehicle 100 is implemented as a battery electric vehicle (BEV) in this example, although may be implemented as a hybrid electric vehicle (HEV) having an internal combustion engine or other type of power plant to provide propulsive power to the vehicle. A BEV 100 may comprise one or more electric machines mechanically coupled to one or more gearboxes to achieve a variety of driving configurations. The electric machines may be powered by a traction battery 124 that wirelessly receives power from an external power source via a wireless charging system 180. Wireless charging system 180 may include a charging plate attached to a vehicle underbody or other portion of the vehicle 100 that may be coupled to a corresponding plate of the external power source by an electromagnetic field (EMF) to transfer power to charge traction battery 124 when the charging plates are in close proximity. Wireless charging system 180 may also be referred to as a contactless or hands-free charging system that does not require connecting or inserting a wired plug or connector to the vehicle 100 during charging from the external power source.

Depending on the particular application, vehicle 100 may include a first front-axle electric machine 160 and a second front-axle electric machine 162 coupled to a front-axle gearbox 116. The front-axle gearbox 116 may include one or more gears that combine the torque from the first front-axle electric machine 160 and the second front-axle electric machine 162 to provide a torque output to a differential portion of the front-axle gearbox 116. The differential portion of the front-axle gearbox 116 may be mechanically coupled to front drive shafts 120 and direct a portion of the torque to a left-side front wheel 170 and a right-side front wheel 172. In other embodiments, a single electric machine may be coupled to a front-axle gearbox to selectively provide driving torque to the associated front wheels 170, 172. Similarly, a second drive unit may include a first rear-axle electric machine 164 and a second rear-axle electric machine 166 coupled to a rear-axle gearbox 114. The rear-axle gearbox 114 may include one or more gears that combine the torque from the first rear-axle electric machine 164 and the second rear-axle electric machine 166 to provide a torque output to a differential portion of the rear-axle gearbox 114. The differential portion of the rear-axle gearbox 114 may be mechanically coupled to rear drive shafts 122 and direct a portion of the torque to a left-side rear wheel 174 and a right-side rear wheel 176. In various embodiments, a single electric machine may be coupled to a rear-axle gearbox to selectively provide driving torque to the associated rear wheels 174, 176. In some configurations, the electric machines 160, 162, 164, 166 may be integrated into or near the wheel assemblies.

The electric machines 160, 162, 164, 166 may be capable of operating as a motor or a generator. The electric machines 160, 162, 164, 166 can provide a propulsion or driving torque as well as a regenerative braking or holding torque capability. The electric machines 160, 162, 164, 166 may act as generators to recover energy that would normally be lost as heat in a friction braking system including friction brakes 144. When operating as a generator, the electric machines may transfer energy to traction battery 124.

An electrical energy store may be implemented by a traction battery or battery pack 124 that stores energy that can be used by the electric machines 160, 162, 164, 166 to provide toque to the vehicle wheels. The traction battery 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 may also be electrically coupled to the electric machines 160, 162, 164, 166 and provides the ability to bi-directionally transfer energy between the traction battery 124 and the electric machines 160, 162, 164, 166. For example, a traction battery 124 may provide a DC voltage while the electric machines 160, 162, 164, 166 may operate with a three-phase alternating current (AC) to function. The power electronics module 126 may convert the DC voltage to a three-phase AC waveform to operate the electric machines 160, 162, 164, 166. In a regenerative mode, the power electronics module 126 may convert the three-phase AC waveform from the electric machines 160, 162, 164, 166 acting as generators to a DC voltage level that is compatible with the traction battery 124. The power electronics module may also convert power provided by the wireless charging system 180 to a DC voltage level suitable for charging the traction battery 124.

In addition to providing energy for propulsion, the traction battery 124 may provide energy for other vehicle electrical systems. The vehicle 100 may include a DC/DC converter module 128 that converts the high-voltage DC output of the traction battery 124 to a low-voltage DC supply that is compatible with low-voltage vehicle loads. An output of the DC/DC converter module 128 may be electrically coupled to an auxiliary battery 130 (e.g., 12V battery). The low-voltage systems may be electrically coupled to the auxiliary battery. One or more electrical loads 146 may be coupled to the high-voltage bus. The electrical loads 146 may have an associated controller that operates and controls the electrical loads 146 when appropriate. Examples of electrical loads 146 may be a heating module or an air-conditioning module.

Braking system 150 includes one or more wheel brakes 144 coupled to the wheels 170, 172, 174, 176 to provide a friction braking torque for vehicle 100 and preventing motion of the vehicle 100. Braking or holding torque may also be provided by one or more of the electric machines 160, 162, 164, and 166. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied.

Electronic modules, controllers, and/or processors in the vehicle 100 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules or controllers and associated actuators and sensors and may include power signals from the auxiliary battery 130. Different signals may be transferred over different channels of the vehicle network. For example, video signals may be transferred over a high-speed channel (e.g., Ethernet) while control signals may be transferred over CAN or dedicated connections. The vehicle network may include any hardware and software components that aid in transferring signals and data between modules. The vehicle network is not shown in FIG. 1 but it may be implied that the vehicle network may connect to any electronic module, controller, or processor that is present in the vehicle 100. A vehicle system controller (VSC) 148 may be present to coordinate the operation of the various components including other modules, controllers, and processors. Controller 148 generally represents one or more controllers programmed individually or in combination to provide a vehicle-based object awareness system and method for wireless charging as described herein. As used throughout this disclosure, an object refers to both inanimate objects, such as a ball, bicycle, wrench, etc., as well as a living object, such as a person, animal, etc.

Although a BEV is depicted, other electrified vehicle technologies and hybrid technologies are possible. For example, the vehicle may be a fuel cell vehicle. The fuel cell vehicle may include a fuel cell as a primary energy source while the traction battery 124 acts as a secondary energy source. The fuel cell vehicle may permit recharging of the traction battery 124 using wireless charging system 180. The vehicle 100 may be a hybrid vehicle that includes an internal combustion engine to provide toque to the vehicle wheels alone and/or in combination with an electric drive capability depending on the operating mode. The implementations described herein may be applicable to any vehicles that include a wireless charger configured to wirelessly receive power from an external power source for recharging an on-board battery or energy store installed in the vehicle 100.

Vehicle 100 may include a human-machine interface (HMI) 190 in communication with system controller 148. HMI 190 may receive operator input to select or activate various vehicle functions or features. For example, HMI 190 may allow the user to select or modify various types of alerts and actions associated with the vehicle-based object aware wireless charging system 180 as described throughout this disclosure. For example, HMI 190 may allow a user to select notification via a connected mobile device app when an object has been detected within a specified zone of the vehicle, or when wireless charging has been interrupted due to object protection. Similarly, the user may be able to select the colors generated by one or more LEDs in response to activation of the wireless charging system or detection of an object within a specified zone of the vehicle during wireless charging. Options may also be provided for selection of audio alerts by the vehicle or one or more connected devices. The particular options available and ability to select one or more options related to the wireless charging system will vary based on the particular application and implementation.

Vehicle 100 may include interior, internal, or ambient lighting as generally represented at 192 provided by various lights within a vehicle passenger cabin, some or all of the lights controllable by one or more controllers, such as system controller 148 whether or not specifically illustrated. Similarly, vehicle 100 may include exterior or external lighting generally represented at 170. Operation of one or more interior lights may be visible outside of the vehicle through vehicle windows or openings. External lighting may include but is not limited to headlights 178, fog lights, turn indicators, taillights/brake lights 182, task lights, puddle lamps/side lights 154, 158, reverse lamps, running lights, etc. Some or all of the external lighting may be controllable by one or more controllers, such as system controller 148 whether or not specifically illustrated. Interior and exterior lighting may be implemented using lamps or lights of one or more technologies including incandescent, HID, LED, fluorescent, etc. Control of one or more lighting functions or modes of operation may include controlling intensity/brightness, color, on/off, static or dynamic pattern of illumination, flashing, etc. depending on the particular type of lighting, function of lighting, etc., which may vary by application.

One or more controllers, such as system controller 148, may communicate with one or more vehicle cameras that provide images of the vehicle surroundings. In the representative embodiment illustrated in FIG. 1, vehicle 100 includes a front camera 138, a rear camera 140, a left-side camera 152, and a right-side camera 156. Images captured by the cameras may or may not be displayed or displayable to a vehicle occupant and may or may not be permanently stored in one or more associated memories for subsequent access. Images captured by one or more cameras may be processed by a controller or processor in communication with the respective camera with an associated signal or message or parameter communicated over the vehicle network for use by one or more connected controllers. Camera images may be used for various vehicle functions such as automatic high/low beam control, lane-keeping control, security/alarm triggering, occupant detection, object detection (trailer, road sign). According to one or more embodiments according to the disclosure, the wireless charging system 180 provides object awareness during wireless charging using at least one camera that is also used for an additional vehicle function to reduce or eliminate the necessity of dedicated special-purpose or single-function cameras dedicated to monitoring for foreign objects for the object awareness feature. Various embodiments use one or more cameras dedicated to object awareness during wireless charging alone or in combination with multi-function cameras when needed based on particular vehicle applications and implementations.

Vehicle 100 includes one or more speakers or similar sound transducers to provide audio signals, alerts, voice messages, and similar sounds. One or more speakers/drivers or similar transducers may be positioned within the passenger cabin, within the vehicle envelope (such as within the trunk, front trunk (frunk), engine compartment or under hood, underbody, etc.), and/or on the vehicle exterior, for example. One or more interior speakers within the vehicle passenger cabin are generally represented by speaker 194. Electrified vehicle 100 may include a front underbody speaker 196 and a rear underbody speaker 198 to provide an audible sound when operating in electric mode at low vehicle speed to alert surrounding bystanders that a moving vehicle is within close proximity. One or more speakers may be utilized by the wireless charging system object awareness feature to provide an audible signal in response to operation of the wireless charging system, or detection of an object within a particular predetermined zone surrounding the vehicle. The audible signal may be configurable and/or may vary based on the particular object detected, the zone within which an object is detected, etc. Similarly, various types of audible signals or alerts may be provided, such as a siren, beep, voice message, horn, etc. by one or more speakers depending on the particular application and implementation.

As also illustrated in the block diagram of FIG. 1, vehicle 100 may include a left-side mirror 134 and a right-side mirror 136. As generally understood by those of ordinary skill in the art, reference to a mirror typically includes the housing, actuator/adjuster, and various related components in addition to one or more reflective surfaces. In the representative embodiment illustrated, each mirror 134, 136 may include one or more exterior lighting elements 154, 158 arranged to provide one or more lighting functions, such as zone lighting projecting generally outward and/or puddle lighting projecting generally downward. Each mirror 134, 136 may also include one or more cameras 152, 156 that may be used with other vehicle cameras to provide a 360 degree view of the vehicle. Cameras 152, 156 may also be used by the wireless charging object awareness feature.

Figure 2:
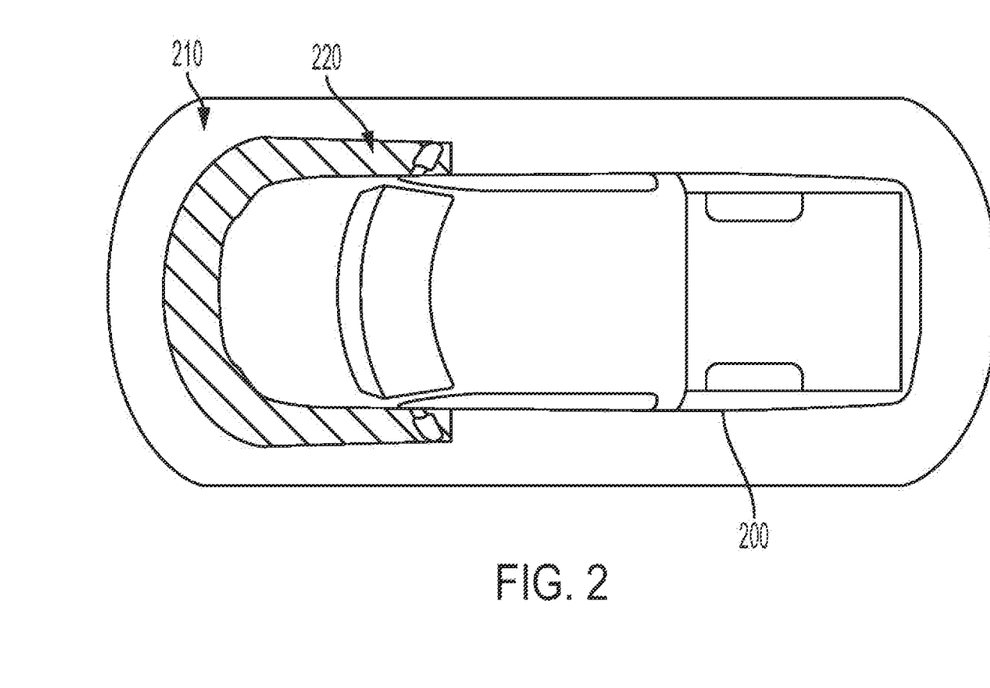
FIG. 2 illustrates representative wireless charging object awareness zones for an electrified vehicle according to one or more embodiments.

FIG. 2 illustrates representative wireless charging object awareness zones for an electrified vehicle according to one or more embodiments. Electrified vehicle 200 includes a first object awareness zone 210 and a second object awareness zone 220. As illustrated, second zone 220 defines an area closer to the vehicle than first zone 210. While illustrated with the first zone 210 surrounding the vehicle and second zone 220 surrounding a front portion of the vehicle, the number and configuration of detection zones may vary based on the particular application and implementation. In general, an outer zone may be provided to alert bystanders approaching the vehicle to maintain distance and one or more inner zones may be provided to trigger reducing wireless charging power or stopping the wireless charging cycle. One or more inner zone boundaries may be designated based on corresponding positions of a wireless charging plate or receiver and/or associated EMF levels during wireless charging.

As previously described, vehicle 200 monitors images from one or more vehicle-integrated cameras prior to initiating and/or during wireless charging of the vehicle 200 to detect an object entering or already within either first zone 210 or second zone 220. The vehicle 200 may generate a visual and/or audible alert in response to detecting an object, with the visual and/or audible alert based on whether the object is detected within the first zone 210 or the second zone 220. The visual alert may be provided by one or more interior and/or exterior lights operated in a mode based on the zone and/or type of object detected. For example, LED lights may be operated in a first color mode while the wireless charging system is operating, a second color mode when an object is detected within first zone 210, and a third color mode when an object is detected within second zone 220. Alternatively, or in combination, one or more lights may be operated in a flashing pattern based on which zone has a detected object and/or based on the type of object detected (inanimate or living). Similarly, various audio alerts may be provided based on which zone has a detected object and/or based on the type of object detected (inanimate or living).

Figure 3:
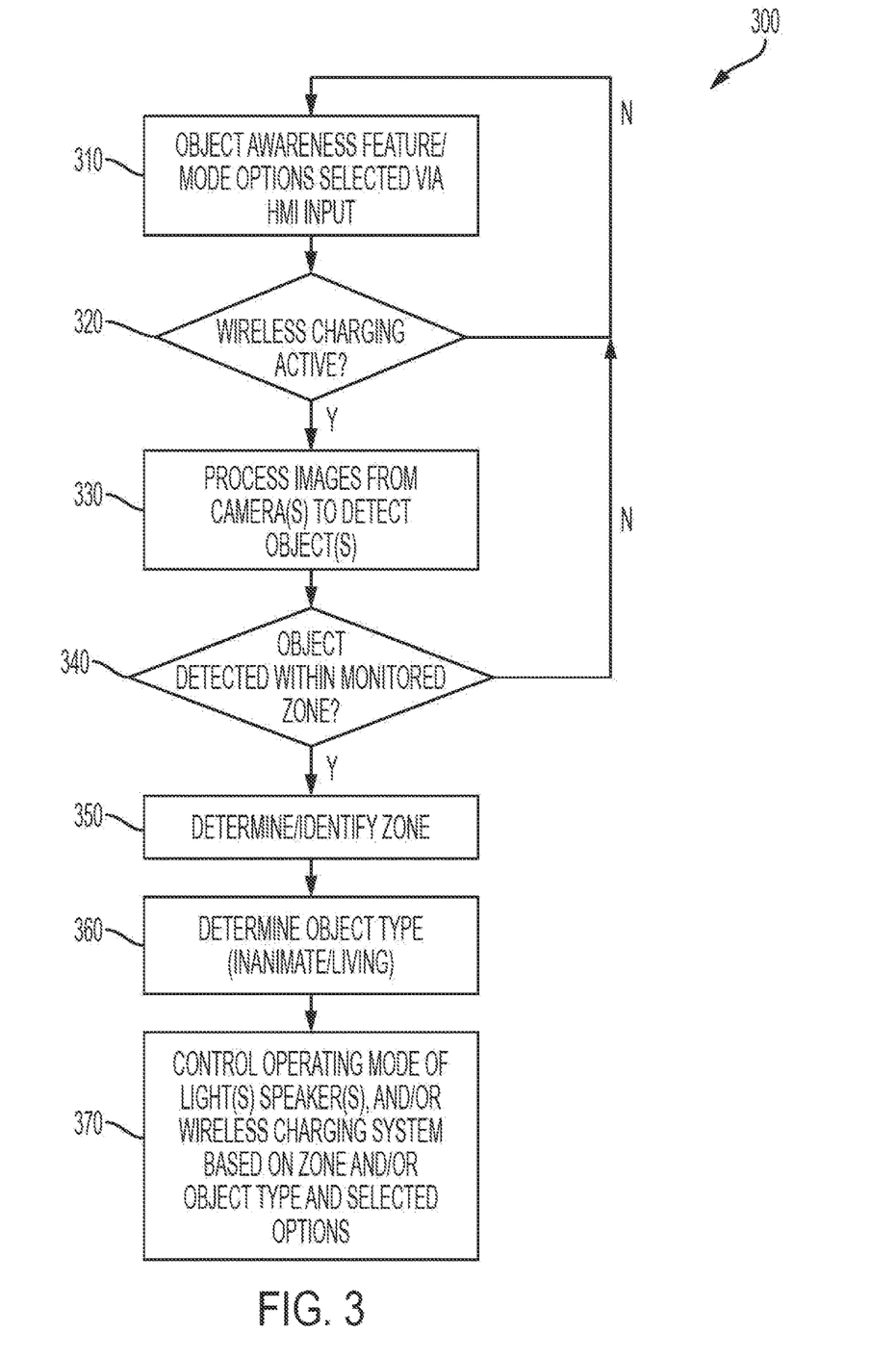
FIG. 3 is a block diagram illustrating operation of a system or method for wireless charging of an electrified vehicle with vehicle-based object awareness according to one or more embodiments.

FIG. 3 illustrates operation of a system or method for controlling an electrified vehicle having a wireless charging system to provide an object awareness feature according to one or more embodiments of the disclosure. Control logic or functions performed by one or more controllers, modules, processors, etc. is generally represented in the diagram of FIG. 3. This illustration provides a representative control strategy, algorithm, and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed. Similarly, the order of processing is not necessarily required to achieve the features and advantages of the claimed subject matter as described herein, but is provided for ease of illustration and description. The control logic may be implemented primarily in software executed along or in combination by a microprocessor-based vehicle, engine, battery, body, electric machine, and/or powertrain controllers, generally represented by system controller 148 of FIG. 1. Of course, the control logic may be implemented in software, hardware, or a combination of software and hardware within a single controller and/or distributed across multiple controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize solid state, electric, magnetic, and/or optical storage to keep executable instructions and associated calibration information, operating variables, and the like.

Representative control logic or algorithm 300 begins at block 310 where various system options may be selected or configured using the vehicle HMI. Available options may include selection of visual/audio alerts for associated object awareness zones. Alerts may include generating a signal for a paired or coupled wireless communication device, such as a smartphone, tablet, or other network-connected device. Block 320 determines whether wireless charging has been requested or activated. During wireless charging, block 330 represents processing of images from one or more vehicle-integrated cameras to detect whether an object is within a designated monitoring zone. When an object is detected in a monitored zone as represented at 340, the system or method may determine which zone the object is in as indicated at 350, and optionally the type of object detected as indicated at 360. The operating mode of at least one light or speaker is controlled based on the zone and/or type of object as represented at 370. The operating mode of a light and/or speaker may include activation (on/off), a pattern of operation (slow/fast flashing or chirping), or change of characteristic, such as color, frequency, intensity/loudness, etc. The wireless charging system may also be controlled to reduce and/or stop power transfer from the wireless charging station to the vehicle wireless charger based on the zone and/or type of object detected. For example, detection of an inanimate object may not trigger a low-power mode of the wireless charger whereas detection of a living object may trigger a rapid shutdown of the wireless charger. As another example, detection of any object in the first zone may trigger a first alert without changing the wireless charger mode whereas detection of the object in the second zone may trigger a rapid shutdown of the wireless charger. The particular selection of combined audio/visual alerts and control of the wireless charging system may vary based on the particular application and implementation.

As generally illustrated in FIGS. 1-3, a system or method for electrified vehicle wireless charging having object awareness detects objects using one or more vehicle-integrated cameras to provide visual and/or audible alerts from one or more vehicle-integrated lights and speakers in response to whether an object is detected in a first zone farther from the vehicle or a second zone closer to the vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information stored on various types of non-transitory storage media including information permanently stored on non-writable storage media such as ROM devices and information alterably stored on writeable storage media such as optical, magnetic, or solid-state media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components.

While representative embodiments are described above, it is not intended that these embodiments describe all possible forms encompassed by the claims. The words used in the specification are words of description rather than limitation, and it is understood that various changes can be made without departing from the claimed subject matter. As previously described, the features of various representative embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to strength, durability, life cycle, marketability, appearance, packaging, size, serviceability, weight, manufacturability, ease of assembly, etc. As such, embodiments described as less desirable than other embodiments or prior art implementations with respect to one or more characteristics are not necessarily outside the scope of the disclosure or claimed subject matter and may be desirable for particular applications.

What is claimed is:

1. An electrified vehicle comprising:
   an electric machine configured to provide torque to vehicle wheels;
   a traction battery coupled to the electric machine;
   a wireless charger coupled to the traction battery and configured to wirelessly receive power from an external power source and charge the traction battery;
   at least one camera positioned to capture an image of an area outside of the electrified vehicle;
   at least one light; and
   a controller in communication with the electric machine, the traction battery, the wireless charger, the at least one camera, and the at least one light, the controller programmed to, while the wireless charger is receiving power from the external power source, operate the at least one light in a first mode of illumination, and in response to detecting an object based on the image from the at least one camera, operate the at least one light in a second mode of illumination;
   wherein the controller is further programmed to operate the at least one light in the second mode of illumination and control the wireless charger to continue receiving power in response to the object being within a first zone of the electrified vehicle, and to stop or reduce power of the wireless charger in response to the object being within a second zone of the electrified vehicle, the second zone being closer to the electrified vehicle than the first zone.

2. The electrified vehicle of claim 1 wherein the at least one light comprises at least one LED and wherein the first mode of illumination has an associated first color and the second mode of illumination has an associated second color.

3. The electrified vehicle of claim 2 wherein the controller is further programmed to operate the at least one light in a third mode of illumination in response to the object being within the second zone of the electrified vehicle.

4. The electrified vehicle of claim 3 further comprising an external speaker, wherein the controller is further programmed to operate the external speaker when the electrified vehicle is operating in an electric mode at a vehicle speed below a corresponding threshold, and to operate the external speaker in response to the object being detected based on the image from the at least one camera while the wireless charger is receiving power from the external power source.

5. The electrified vehicle of claim 4 wherein the at least one camera comprises:
   a front camera positioned to capture an image including an area forward of the electrified vehicle;

a right-side camera positioned to capture an image including an area on a right side of the electrified vehicle;
a left-side camera positioned to capture an image including an area on a left side of the electrified vehicle; and
a rear camera positioned to capture an image including an area rearward of the electrified vehicle.

6. The electrified vehicle of claim 5 wherein the right-side camera and the left-side camera are each connected to a respective side mirror of the electrified vehicle.

7. The electrified vehicle of claim 1 wherein the at least one light comprises at least one LED disposed within an interior of the electrified vehicle.

8. The electrified vehicle of claim 1 wherein the at least one light comprises at least one LED disposed on each of an external left-side mirror and an external right-side mirror.

9. The electrified vehicle of claim 1 wherein the at least one camera comprises:
a front camera positioned to capture an image including an area forward of the electrified vehicle;
a right-side camera positioned to capture an image including an area on a right side of the electrified vehicle;
a left-side camera positioned to capture an image including an area on a left side of the electrified vehicle; and
a rear camera positioned to capture an image including an area rearward of the electrified vehicle.

10. The electrified vehicle of claim 9 further comprising at least one speaker, wherein the controller is further programmed to operate the at least one speaker in response to an object being detected based on the image from the at least one camera while the wireless charger is receiving power from the external power source.

11. The electrified vehicle of claim 10 wherein the controller operates the at least one speaker in a first mode in response to the object being detected within a first zone and operates the at least one speaker in a second mode in response to the object being detected within a second zone, the second zone being closer to the electrified vehicle than the first zone.

12. A method for controlling a vehicle having a traction battery coupled to an electric machine configured to provide torque to vehicle wheels, a wireless charger configured to wirelessly receive power from an external power source during charging of the traction battery, at least one light, at least one camera, and at least one speaker, the method comprising, by a vehicle controller:
detecting an object within one of a first zone and a second zone of the vehicle based on an image from the at least one camera while the wireless charger is receiving power from an external power source, the second zone defining an area closer to the vehicle than the first zone;
operating the at least one light or the at least one speaker and controlling the wireless charger to continue receiving power in response to the object being detected within the first zone; and
controlling the wireless charger to stop or reduce power in response to the object being detected within the second zone.

13. The method of claim 12 further comprising:
operating the at least one light to generate a first color in response to the object being detected within the first zone and to generate a second color in response to the object being detected in the second zone.

14. The method of claim 12 further comprising:
operating the at least one speaker to generate a first sound in response to the object being detected within the first zone and to generate a second sound different from the first sound in response to the object being detected within the second zone.

15. A vehicle system comprising:
a wireless charger configured to wirelessly receive power from an external power source;
a plurality of cameras including at least a front facing camera, a rear facing camera, a left-side camera, and a right-side camera;
a plurality of LEDs; and
at least one controller programmed individually or in combination to, when the wireless charger is receiving power from the external power source, process images from at least one of the plurality of cameras and operate the plurality of LEDs to generate a first color and control the wireless charger to continue receiving power in response to detection of an object within the images being within a first vehicle zone surrounding the vehicle, and to operate the plurality of LEDs to generate a second color and stop or reduce power of the wireless charger in response to detection of the object within the images being with a second zone of the vehicle, the second zone being surrounded by the first zone.

16. The vehicle system of claim 15 further comprising at least one external speaker operated by the at least one controller at low vehicle speeds to alert surrounding bystanders that a moving vehicle is within close proximity, wherein the at least one controller is programmed individually or in combination to operate the at least one external speaker based on the detection of the object within the images.

17. The vehicle system of claim 16 further comprising an external left-side mirror and an external right-side mirror each having at least one of the plurality of LEDs.

* * * * *